March 8, 1927.
P. J. JORGENSEN ET AL
1,620,557
LUBRICANT CUP
Filed Nov. 24, 1922
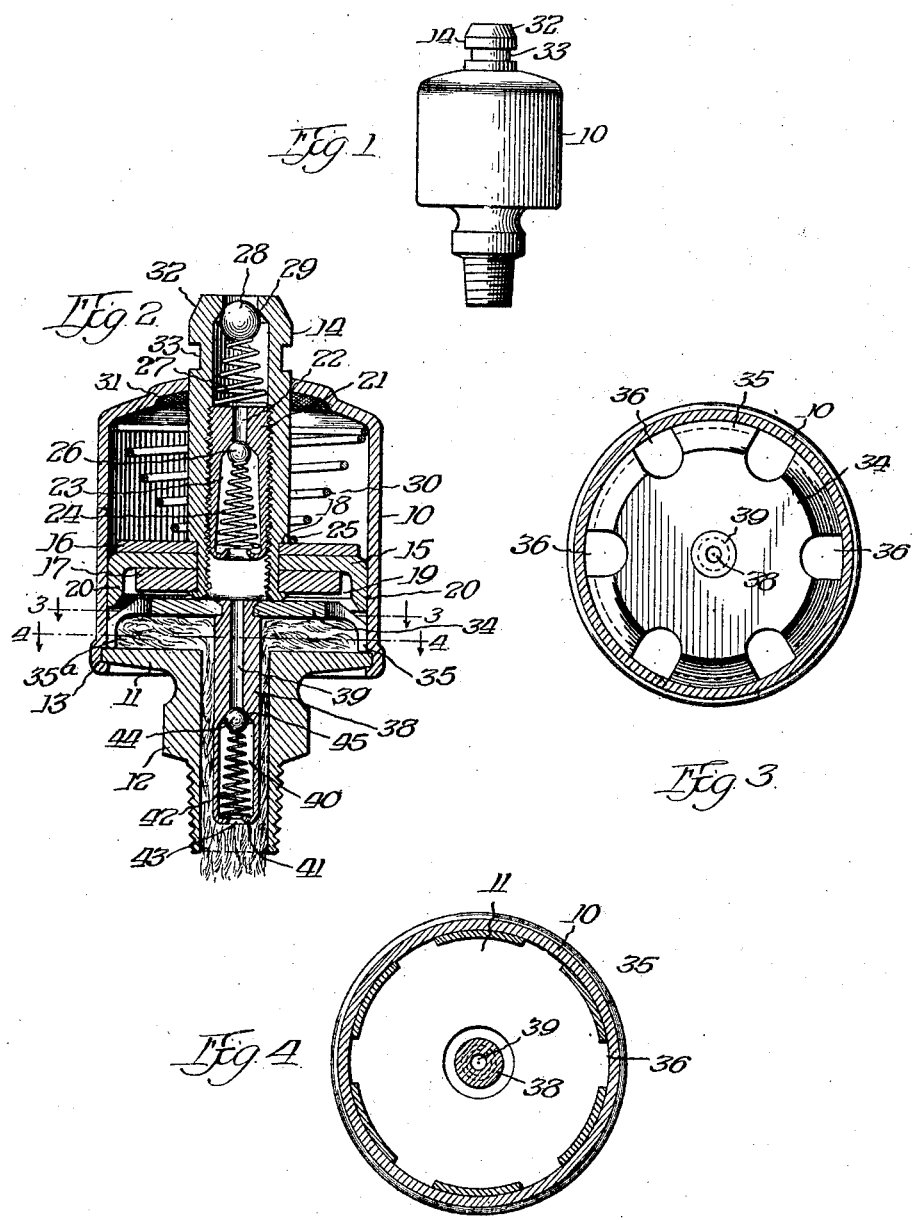
Inventors
Peter J. Jorgensen
Clarence H. Jorgensen Patented Mar. 8, 1927.

1,620,557

UNITED STATES PATENT OFFICE.

PETER J. JORGENSEN AND CLARENCE H. JORGENSEN, OF CHICAGO, ILLINOIS.

LUBRICANT CUP.

Application filed November 24, 1922. Serial No. 602,940.

Our invention relates to lubricant cups and has particular reference to a cup of this character adapted for use in providing proper lubrication for automobiles although the device may be used for various industrial purposes as well.

The primary object of our invention is a provision of a lubricant cup having a reservoir containing a supply of oil with a constant pressure thereon, whereby the lubricant is forced into the bearing and also a proper retarding and feeding means for preventing the oil flowing from the cup too rapidly and supplying the proper amount to the bearing surfaces, the retarding and feeding means being placed in a chamber in the lower portion of the cup and separated from the chamber forming the main reservoir.

Another and further object of our invention is the provision of a lubricant cup which is separated into compartments by a baffle having openings therein, one of which compartments serves as a main oil reservoir, and the other contains a packing material, preferably an absorbent in the form of wicking, which prevents the oil flowing from the cup too rapidly and which serves to convey the proper amount of lubricant to the bearing surfaces.

Another and further object of our invention is the provision of a cup for supplying oil to bearings in the proper quantity and in the requisite amount desired to insure proper lubrication of the bearings with oil as distinguished from grease as has been the lubricating medium in common usage heretofore.

Another and further object of our invention is a provision of an oil cup having means therein whereby the bearing can be flushed with oil by means of a suitable apparatus for applying pressure to the oil so that the old and used oil is cleaned out of the bearing and the surface of the bearing coated with new and fresh oil with a supply left in the lubricating cup so that the bearing is kept supplied with oil after the filling operation.

These and further objects of our invention will be more fully and better understood by reference to the accompanying drawings, and wherein—

Figure 1 is a side elevational view of our improved oil cup;

Figure 2 is a vertical sectional view showing in detail the various parts of our improved invention;

Figure 3 is a cross-sectional view on lines 3—3 of Figure 2; and

Figure 4 is a cross-sectional view on lines 4—4 of Figure 2.

Referring now specifically to the drawings, in which like reference characters refer to like parts throughout, a main body 10 is provided having a base 11 which forms the bottom of the cup and a hollow stem 12 integral with said base projecting downwardly therefrom and which is threaded at its lower end and adapted to be secured to a bearing, the stem 12 forming the discharge conduit from the cup. The body 10 is made of brass or other suitable material and is turned down around the base 11 at 13 so that a secure joint is formed at this point, the parts hereinafter described being inserted in the body 10 before this operation is completed. Mounted within the body 10 and projected outwardly therefrom through an opening in the top thereof is a hollow stem 14 forming a charging port for the oil cup and to which a diaphragm 15 is attached at its lower end, with washers 16 and 17 on each side thereof, the washer 16 being engaged by a shoulder 18 on the stem 14 and the washer 17 having the lower end 19 of the stem turned outwardly so that the diaphragm 15 is held in proper position in the member 10 and is bodily movable therewith. The diaphragm 15 has a downwardly extending marginal flange 20 at its outer periphery, the sides of the flange 20 being in frictional engagement with the inside portion of the body 10. The member 14 is hollow and is internally threaded at its inner lower portion and has a plug 21 inserted therein, and in threaded engagement therewith, the said plug 21 having a conduit 22 at the upper end thereof and a recess 23 at the lower portion within which a coil spring 24 is positioned, the lower end of the plug being turned inward to form a flange 25 which acts as a seat for the spring 24. A ball 26 is provided which is seated on the upper end of the spring 24 and serves to close the conduit 22 in the upper end of the plug 21 against the outward flow of oil. A second coil spring 27 is provided which is seated upon the upper end of the plug 21 and has a ball 28 seated on its upper end, the said ball being in engagement with a seat 29 formed on the inner side of the end of the stem 14 so that two valves are provided which effectively prevent any escape of the oil from the cup after it has been filled.

A coil spring 30 is provided in the body of the cup 10 the upper end of which is seated against the upper portion of the body 10 and the lower end against the washer 16, and exerting its force downwardly upon the diaphragm 15, thus insuring pressure upon the contents of the oil cup. A washer 31 of felt or the like is provided surrounding the stem 14 at its upper end to prevent dirt getting into the cup around the stem 14. The upper end of the conduit 14 is slightly tapered at 32 allowing for the easy attachment of an oil gun to the stem 14 and has an annular recess 33 therein within which the jaws of the connecting means of the oil gun engage so that an oil-tight joint is formed between an oil gun and the cup.

Positioned in the lower part of the oil cup and extending transversely of said cup is a baffle 34 having its marginal edge 35 turned downwardly and which rests upon the base 11 of the oil cup and has a plurality of recesses 36 therein, through which the oil passes to the chamber 35ª in the lower part of the cup and within which packing 37 is placed, preferably an absorbent in the form of a wick, which extends into the discharge conduit 12 and which prevents the oil from escaping from the cup too rapidly and which allows the proper amount of oil to be conveyed down to the bearing so that it is kept properly lubricated, the baffle 34 being spaced from the bottom of the body of the oil cup. Centrally located of the baffle 34 and secured thereto in alignment with the center of the stem 14 is a plug 38 having a conduit 39 extending longitudinally thereof to an enlarged recess 40 in the lower end of the member 39, and having its lower edges 41 turned inwardly to form a seat for a spring 42, which is seated within the recess 40; the said plug 38 having an outlet 43 at the lower end thereof. The plug 38 terminates a short distance above the end of the outlet plug 12 and extends vertically of the plug 12 and has the packing heretofore described positioned around its outer sides. A ball 44 is seated against shoulders 45 and serves as a valve to close the conduit 39, the force of the spring 40 being greater than the force of the spring 30 as will be more fully described hereinafter. In the operation of the device, an oil gun is connected to the upper end of the member 14 and pressure applied to the contents of the oil gun, which has the effect of forcing the ball 28 away from its seat and allowing the oil to pass downwardly through the stem 14 and unseating the ball 26 from its seat so that the oil passes into the space between the baffle 34 and the diaphragm 15, compressing the spring 30 and filling the chamber above the baffle 34, the diaphragm 15 being forced upward in the cup so the stem 14 projects a short distance therefrom when the body 10 is filled with oil. Pressure applied to the oil in the gun forces the oil downwardly through the openings 36 in the baffle 34, and as soon as the cup is filled, unseats the ball 44 from its seat and forces oil downwardly through the member 38, into the bearing, thus flushing out the bearing of all used oil and providing new and clean oil for the bearing by means of which it is properly lubricated. It will thus be understood that the cup is not only filled with oil, but that the cup provides means for properly flushing out a bearing which has not been accomplished heretofore. In addition thereto the packing is prevented from becoming solid because the baffle prevents the full pressure of the spring 30 from being exerted thereon and also prevents the full force of the oil from the oil gun being exerted on the said packing, thus allowing the packing to be loosely positioned underneath the baffle 34 so the oil can easily flow therethrough.

While we have described more or less precisely the details of construction of our invention, we do not wish to be understood as limiting ourselves thereto, as we contemplate changes in form and the proportion of parts and the substitution of equivalents as circumstances may suggest or render expedient, without departing from the spirit or scope of our invention.

We claim:

1. A lubricant cup having a discharge conduit leading therefrom, a perforate baffle plate separating the said cup into an upper and lower chamber, an absorbent in the said lower chamber extending into the said discharge conduit, a movable diaphragm in the upper chamber of said cup, a feeding conduit secured to said diaphragm and a spring positioned between said diaphragm and seated against the upper part of said oil cup whereby a constant pressure is maintained on the contents of the said oil cup in the upper chamber thereof.

2. An oil cup having a filling conduit and a discharge conduit leading therefrom, a perforate baffle separating the said cup into an upper and lower chamber, an absorbent in the said lower chamber extending into the said discharge conduit, a pipe connected to said baffle and extending to the discharge end thereof and a valve in said pipe.

3. An oil cup having a filling conduit and a discharge conduit leading therefrom, a perforate baffle separating the said cup into an upper and lower chamber, an absorbent in the said lower chamber extending into the said discharge conduit, a pipe connected to said baffle and extending to the discharge end thereof and a spring pressed valve in said pipe.

4. An oil cup having a filling conduit and a discharge conduit leading therefrom, a movable spring pressed diaphragm in said oil cup connected to said filling conduit, a valve in said filling conduit, a perforate baffle separating the oil cup into an upper and lower chamber, an absorbent in said lower chamber, a pipe connected to said baffle pipe extending into said discharge conduit and a spring pressed valve in said pipe, the spring controlling the valve in said pipe being capable of exerting a greater force upon said valve than the spring controlling the said diaphragm.

5. A lubricant cup having a discharge conduit leading therefrom, a movable spring pressed diaphragm in said cup, a charging stem connected to said diaphragm, a plug in said charging stem having a feeding conduit therethrough, a valve in said plug, a second valve at the outer end of said charging stem, and means in said discharge conduit to retard the flow of oil from said cup.

6. A lubricant cup having a discharge conduit leading therefrom, a movable spring pressed diaphragm in said cup, a charging stem connected to said diaphragm, valves in said charging stem to prevent the outward flow of oil, a baffle in said oil cup, an absorbent below said baffle extending into the discharge conduit, a secondary discharge conduit leading into the main chamber of the oil cup and valve means in said secondary oil cup to prevent the outward flow of oil in normal operation and adapted to be unseated upon pressure being applied to the contents of the said oil cup in excess of the amount necessary to fill said cup.

7. A lubricant cup having a charging stem and a discharging conduit, an absorbent in the said cup adapted to retard the flow of oil therefrom, means for exerting pressure upon the contents of said cup, a tube leading from said cup into the said discharge conduit, and a valve in said tube operable by pressure in excess of that normally applied to the contents of said cup.

8. A lubricant cup having a discharge conduit, a movable spring pressed diaphragm in said cup, a charging stem leading into said oil cup below said diaphragm, a baffle dividing said cup into upper and lower chambers, an absorbent in the said lower chamber, a tube leading from said cup into said discharge conduit, and a spring controlled valve in said tube, the force exerted by said spring being in excess of the normal operation pressure on said cup.

Signed at Chicago, Illinois, this 15th day of November, 1922.

PETER J. JORGENSEN.
CLARENCE H. JORGENSEN.